(12) United States Patent
Muehlleitner

(10) Patent No.: US 10,570,573 B2
(45) Date of Patent: Feb. 25, 2020

(54) RAIL WELDING UNIT WITH ECCENTRIC CAM DRIVEN CLAMPING LEVERS

(71) Applicant: PLASSER & THEURER EXPORT VON BAHNBAUMASCHINEN GESELLSCHAFT M.B.H., Vienna (AT)

(72) Inventor: Heinz Muehlleitner, Neidling (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 118 days.

(21) Appl. No.: 15/516,186

(22) PCT Filed: Sep. 7, 2015

(86) PCT No.: PCT/EP2015/001796
§ 371 (c)(1),
(2) Date: Mar. 31, 2017

(87) PCT Pub. No.: WO2016/050337
PCT Pub. Date: Apr. 7, 2016

(65) Prior Publication Data
US 2017/0292225 A1   Oct. 12, 2017

(30) Foreign Application Priority Data

Oct. 1, 2014   (AT) ..................... 738/2014

(51) Int. Cl.
*B23K 37/04* (2006.01)
*E01B 29/46* (2006.01)
(Continued)

(52) U.S. Cl.
CPC .......... *E01B 29/46* (2013.01); *B23K 37/0435* (2013.01); *B23K 2101/26* (2018.08); *E01B 11/44* (2013.01)

(58) Field of Classification Search
CPC .............. B23K 11/0073; B23K 11/046; B23K 37/0435; B23K 2101/26; E01B 11/44; E01B 29/46
See application file for complete search history.

(56) References Cited

U.S. PATENT DOCUMENTS 2,911,516 A * 11/1959 Cox .................... B23K 11/0073
219/101
4,215,260 A *  7/1980 Zollinger ........... B23K 37/0435
219/53

(Continued)

FOREIGN PATENT DOCUMENTS

CH       703854 A2    3/2012
EP       0566941 A1  10/1993
(Continued)

*Primary Examiner* — Erin B Saad
*Assistant Examiner* — Carlos J Gamino
(74) *Attorney, Agent, or Firm* — Laurence A. Greenberg; Werner H. Stemer; Ralph E. Locher

(57) ABSTRACT

A welding unit for welding together two rails of a track includes two rail clamping assemblies which can be moved towards one another in a longitudinal direction of the rail along unit guides by compression cylinders. Each rail clamping assembly is equipped with clamping jaws which are displaceable in pairs in a pressing plane and each of which has a contact surface provided for application to a rail web. The clamping jaws are each constructed as clamping levers which are pivotable in the pressing plane about a lever pivot axis. The contact surface intended for application to the rail web is disposed at a first lever end spaced apart from the lever pivot axis. The two contact surfaces of each rail clamping assembly are each positioned closer to the oppositely disposed rail clamping assembly than the two lever pivot axes.

8 Claims, 4 Drawing Sheets

(51) Int. Cl.
*B23K 101/26* (2006.01)
*E01B 11/44* (2006.01)

(56) References Cited

U.S. PATENT DOCUMENTS

| | | | | |
|---|---|---|---|---|
| 4,414,454 | A * | 11/1983 | Zollinger | B23K 11/0073 |
| | | | | 219/53 |
| 5,099,097 | A * | 3/1992 | Theurer | E01B 29/46 |
| | | | | 219/53 |
| 5,136,140 | A * | 8/1992 | Theurer | E01B 29/46 |
| | | | | 219/161 |
| 5,146,816 | A * | 9/1992 | Badstieber | E04G 17/04 |
| | | | | 269/218 |
| 5,389,760 | A | 2/1995 | Zollinger | |
| 6,396,020 | B1 * | 5/2002 | Thelen | B23K 9/0026 |
| | | | | 219/54 |
| 7,470,871 | B2 | 12/2008 | Theurer et al. | |
| 8,979,083 | B2 | 3/2015 | Theurer et al. | |
| 2002/0170884 | A1 * | 11/2002 | Thelen | B23K 9/0026 |
| | | | | 219/54 |
| 2005/0067381 | A1 * | 3/2005 | Coomer | B23K 9/0026 |
| | | | | 219/54 |

FOREIGN PATENT DOCUMENTS

| | | | | |
|---|---|---|---|---|
| EP | 0597215 | A1 | 5/1994 | |
| EP | 1736602 | A1 | 12/2006 | |
| GB | 2510221 | A | 7/2014 | |
| KR | 20110049442 | A | 5/2011 | |
| WO | WO-2005097381 | A1 * | 10/2005 | ......... B23B 1/16195 |
| WO | 2010063362 | A1 | 6/2010 | |

* cited by examiner

RAIL WELDING UNIT WITH ECCENTRIC CAM DRIVEN CLAMPING LEVERS

BACKGROUND OF THE INVENTION

Field of the Invention

The invention relates to a welding unit for welding together two rails of a track, including two rail clamping assemblies which can be moved towards one another along unit guides in the rail longitudinal direction by means of compression cylinders, each rail clamping assembly being equipped with clamping jaws which are displaceable in pairs within a pressing plane and have in each case a contact surface provided for application to a rail web.

A welding unit of this type is known from WO2010063362. On each rail clamping assembly there are provided two clamping drives, displaceable in a linear motion perpendicularly to the rail longitudinal direction in the pressing plane, for pressing clamping jaws to the rail web.

According to EP 0 597 215 A1 and CH 703 854 A2, welding units are also known in the case of which the clamping jaws are pressed to the rail web by rotation of an eccentric shaft.

SUMMARY OF THE INVENTION

It is the object of the present invention to provide a welding unit of the type mentioned at the beginning with a simplified structural design of the rail clamping assembly.

According to the invention, this object is achieved with a welding unit of the specified kind by way of the features cited in the characterizing part of the main claim.

With clamping levers of this kind which can be of simple structural design, it is possible to achieve a self-clamping effect that withstands very high pulling forces without problems. As a result, there is no need for clamping cylinders of large dimensions which furthermore lead to an unwieldy dimensioning of the entire welding unit. The resulting reduction in size of the welding unit also enables problem-free employment in spatially constricted track sections and additionally accounts for a smaller total mass.

Additional advantages of the invention become apparent from the dependent claims and the drawing description.

BRIEF DESCRIPTION OF THE SEVERAL VIEWS OF THE DRAWING

The invention will be described in more detail below with reference to embodiments represented in the drawing in which.

DESCRIPTION OF THE INVENTION

Figure 1:
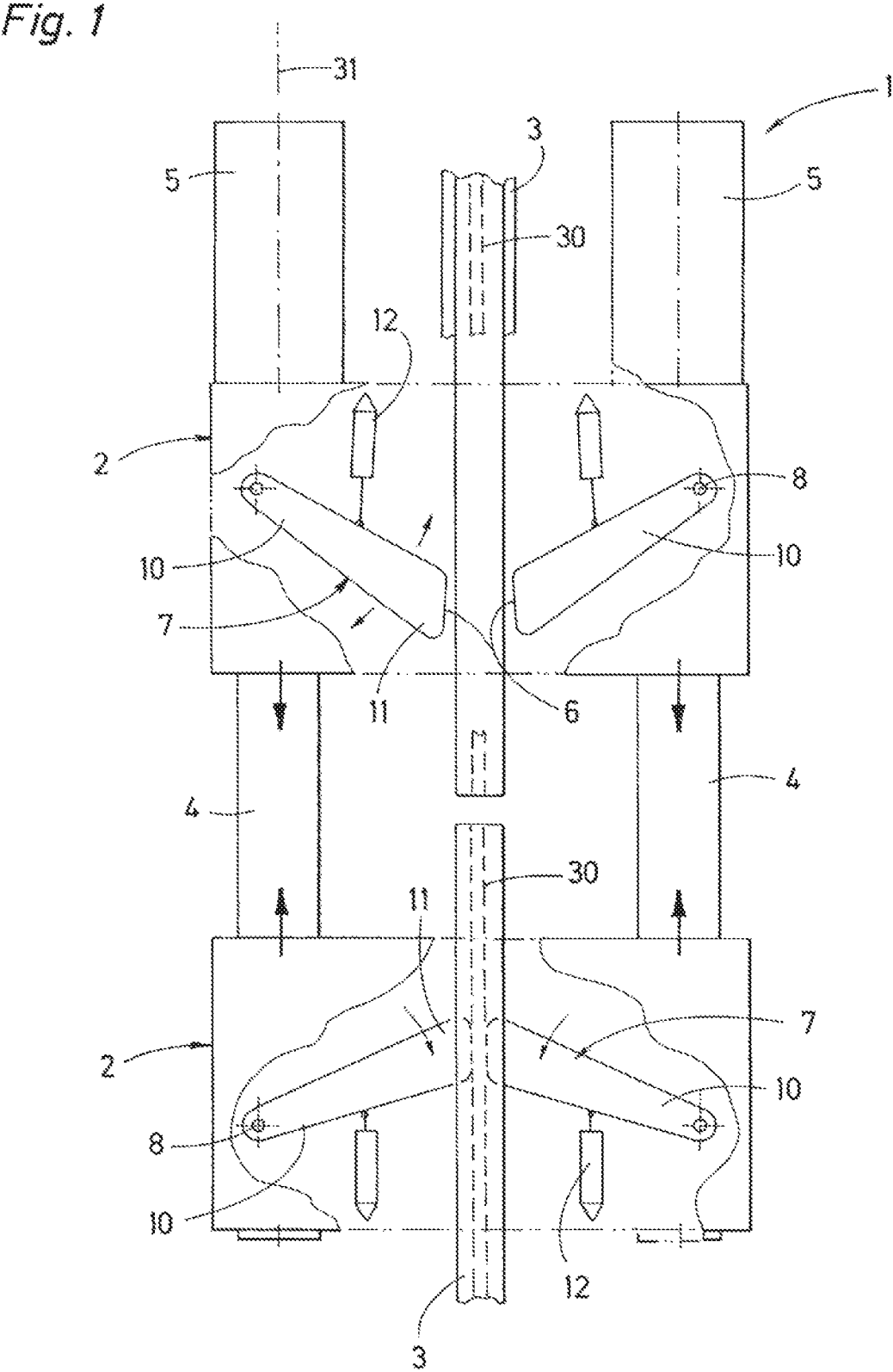
FIG. 1 shows a schematic top view of a structurally greatly simplified embodiment of a welding unit having pivotable clamping levers.

A welding unit 1 according to the invention, shown in FIG. 1 in a general basic variant, consists of two rail clamping assemblies 2 for connecting two rails 3 by means of flash-butt welding, the rail clamping assemblies being movable towards one another in a rail longitudinal direction. The said displacement motion of the two rail clamping assemblies 2 takes place along unit guides 4 by means of hydraulically actuatable compression cylinders 5. The unit guides 4 have guide axes 31 extending parallel to the rail longitudinal direction.

Each rail clamping assembly 2 is equipped with clamping jaws 7 which are displaceable in pairs and each have a contact surface 6 intended for application to a rail web 30 of the rail 3. Said clamping jaws 7 are each designed as clamping levers 10 which are pivotable about a lever pivot axis 8 in a pressing plane 9 which is perpendicular to said axis (see FIG. 2).

The contact surface 6 intended for application to the rail web 30 is arranged at a first lever end 11 distanced from the lever pivot axis 8, wherein both contact surfaces 6 of each rail clamping assembly 2 are positioned in each case closer to the oppositely disposed rail clamping assembly 2 than the two lever pivot axes 8.

Each clamping lever 10 is pivotable in the pressing plane 9 by means of a clamping drive 12, fixed to the rail clamping assembly 2, from an opened position (see upper rail clamping assembly 2 in FIG. 1) into a clamping position (see lower rail clamping assembly 2). In this clamping position, a force-locked connection results from pressing the contact surface 6 to the rail web 30.

Owing to the motion of the rail clamping assemblies 2 towards one another caused by the two compression cylinders 5, the said force-locked connection is even enhanced automatically in the context of a self-clamping effect. As soon as the welding operation by power supply is terminated, a movement of the two rail clamping assemblies 2 apart from one another in the rail longitudinal direction takes place (after a shearing off of the weld bead, which is not essential herein), in which the clamping effect of the clamping levers 10 is automatically cancelled by the inevitably following slight pivoting motion. Finally, a further opening up takes place by actuation of the clamping drives 12 in order to at last be able to lift the welding unit 1 off the welded rail 3.

The further FIGS. 2 to 6 show a preferred embodiment of the invention, wherein the parts having the same function are denoted by the same reference numerals as in FIG. 1.

Figure 2:
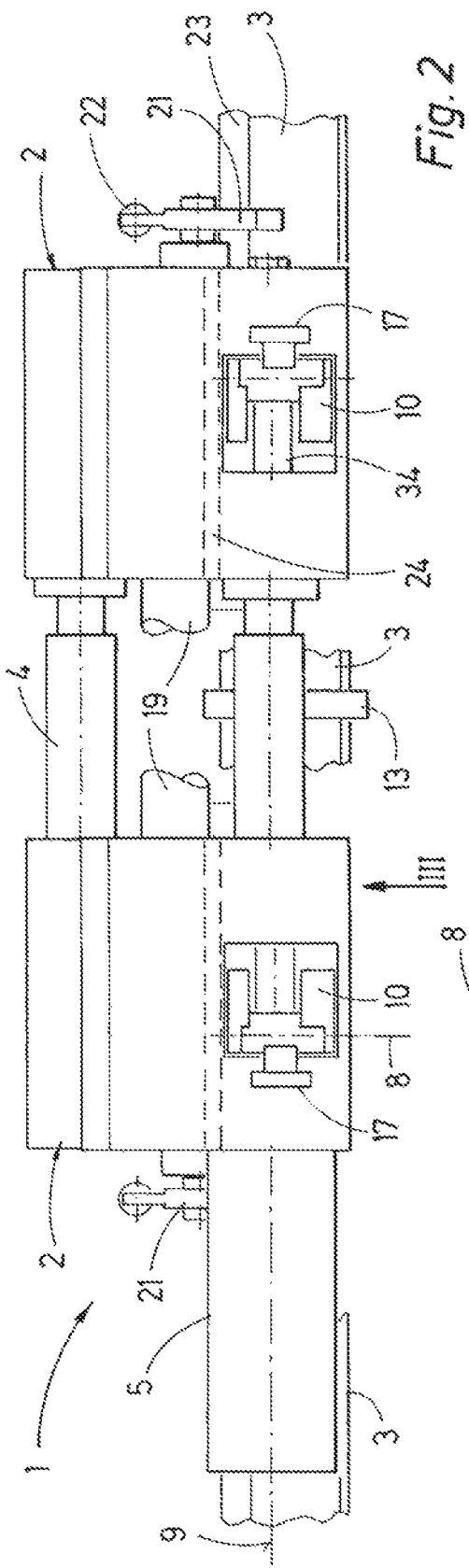
FIGS. 2 and 3 show a partial side view and view (according to arrow III in FIG. 2) of a further embodiment.

As visible in FIG. 2, a shearing device 13 for shearing off a weld bead is provided between the two rail clamping assemblies 2 which are movable towards one another by means of the compression cylinders 5.

Figure 3:
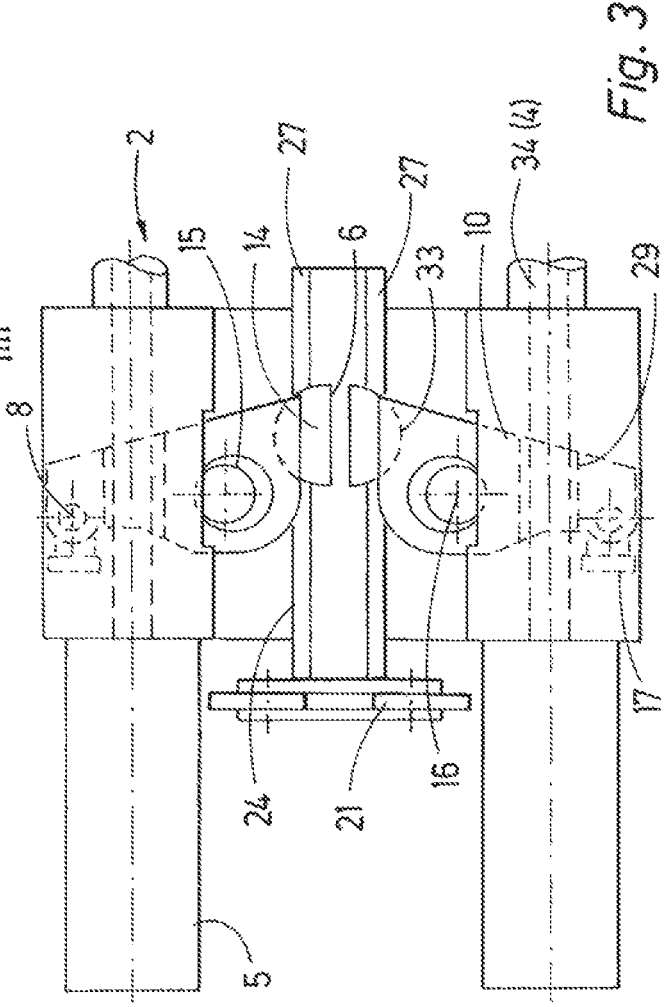
Figure 4:
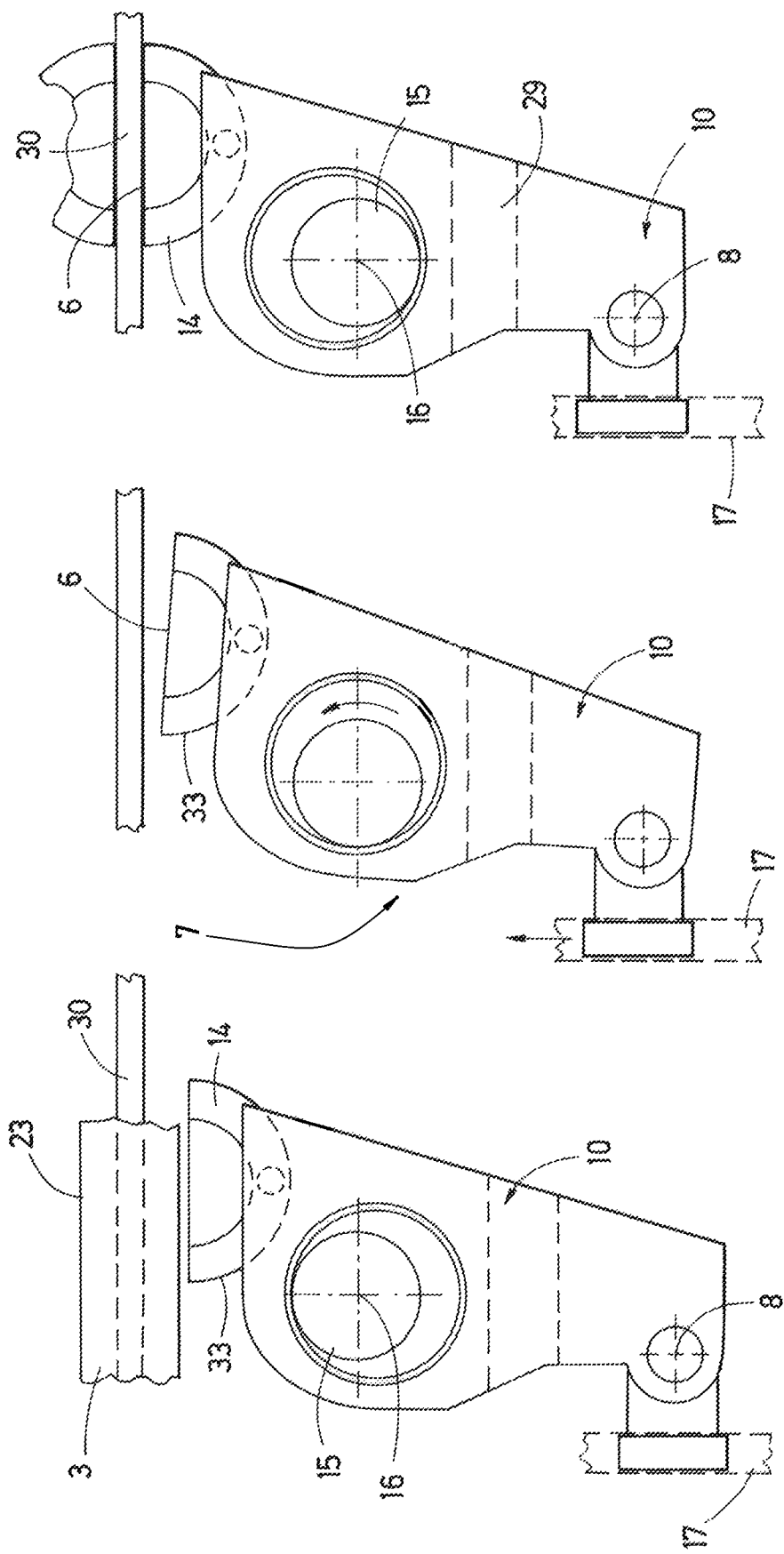
FIG. 4 shows a detail view of a clamping lever in three different positions.

Differing from the variant described in FIG. 1, the first lever end 11—as shown in FIGS. 3 and 4—is designed as a clamping element 14, comprising the contact surface 6, which is movable to a small degree in the pressing plane 9 relative to the adjoining section of the clamping lever 10. To that end, the clamping element 14, configured as a bisected circular disk, is mounted in the clamping lever 10 for rotation about its semi-circular gliding surface 33. Current required for the welding operation is delivered via a power supply.

As can be seen in particular in connection with FIG. 4, a lever eccentric cam 15 having an eccentric axis 16 extending perpendicularly to the pressing plane 9 is arranged between the clamping element 14 and the lever pivot axis 8 for displacement of the clamping lever 10 relative to the rail clamping assembly 2 and in the pressing plane 9. Furthermore, the lever pivot axis 8 is designed for displacement parallel to the pressing plane 9 and relative to the rail clamping assembly 2 in a lever gliding track 17 arranged on the rail clamping assembly 2 (see FIGS. 2 and 3).

Figure 5:
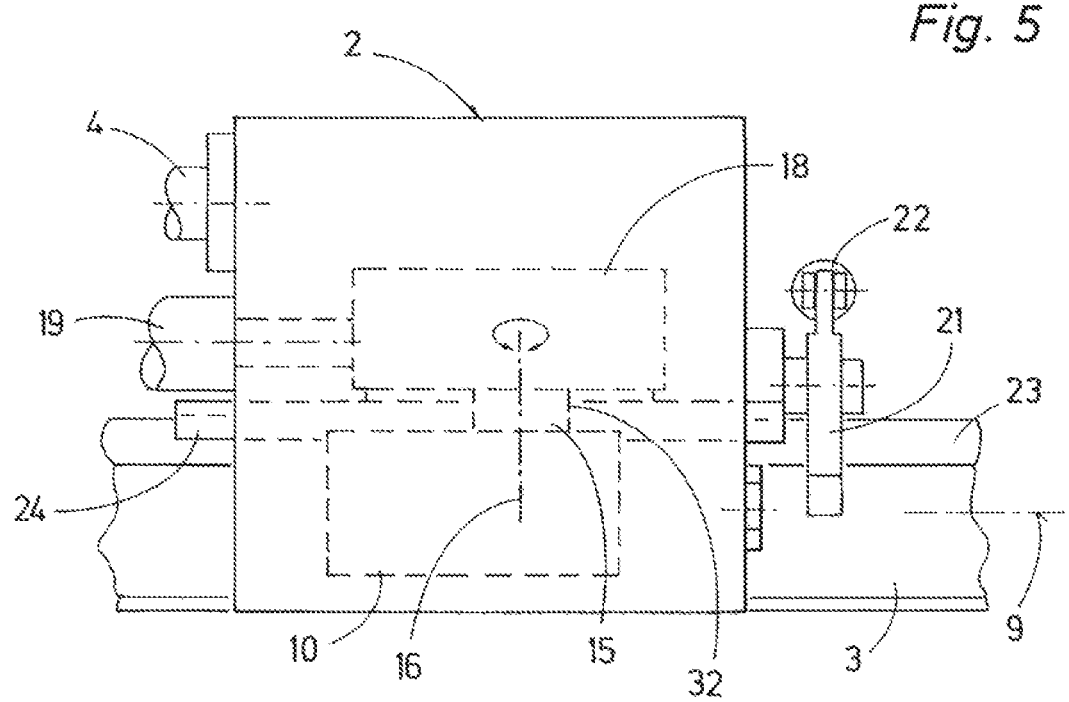
FIGS. 5 and 6 show a side view and a view in the rail longitudinal direction of a rail clamping assembly.

As visible especially in FIG. 5, the lever eccentric cams 15 of the two clamping levers 10 associated in each case with a rail clamping assembly 2 are fastened by means of a bolt 32, comprising the eccentric axis 16, on a lever carriage 18. The latter is displaceable parallel to the pressing plane 9 and in the rail longitudinal direction relative to the rail clamping assembly 2 by means of a carriage drive 19. Each lever eccentric cam 15 is rotatable about the eccentric axis 16 by means of an eccenter drive 20 (see FIG. 6) mounted to the lever carriage 18. This rotating movement can be carried out, for example, by means of a worm gear (not shown) between the bolt 32 and the eccenter drive 20.

Figure 6:
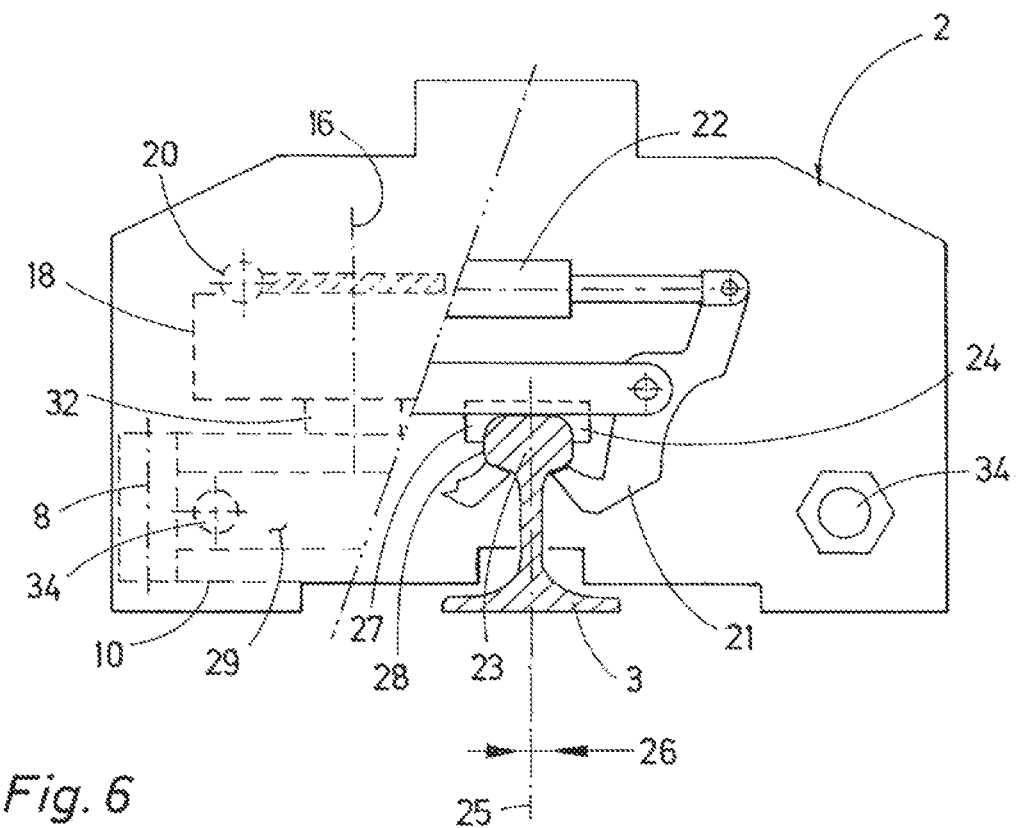

As visible FIGS. 2, 3 and 6, rail fixing tongs 21 are arranged in each case on the outside of the two rail clamping assemblies 2. These rail fixing tongs 21 are equipped with a tong drive 22 for a pincer-like gripping of the corresponding rail 3 and for pressing the rail head 23 thereof to a rail head carriage 24. The rail head carriage 24, which is connected to the rail fixing tongs 21, is in turn connected to the lever carriage 18 and displaceable in a pressing direction 26 extending perpendicularly to the rail longitudinal direction (or perpendicularly to a vertical rail plane of symmetry 25—see FIG. 6) relative to the lever carriage 18 and parallel to the pressing plane 9. The rail head carriage 24 has two stop bars 27, spaced from one another in the pressing direction 26, for application of a respective rail head side surface 28 of the rail head 23.

As visible especially in FIGS. 3 and 6, each clamping lever 10 has an opening 29 for passage of a pull rod 34 serving as an assembly guide 4. Thus, the clamping lever 10 can be moved unobstructed relative to the rail clamping assembly 2.

The mode of operation of the welding unit 1 according to the invention will now be described in more detail.

At the start of the welding operation, the welding unit 1 is lowered onto the two rail ends of the rails 3 to be welded, with the clamping levers 10 being opened far enough so that a problem-free passage of the respective rail head 23 is possible (see left-hand position in FIG. 4). This also applies to the two rail fixing tongs 21.

With actuation of the tong drive 22, the rail fixing tongs 21 are closed (see FIG. 6), as a result of which the rail head 23 is automatically pressed against the rail head carriage 24 and thus is precisely centred in the vertical direction.

In further sequence, the clamping elements 14 of the two clamping levers 10 of each rail clamping assembly 2 are pressed against the rail web 30 in that the two lever carriages 18 are moved by the carriage drives 19 in the rail longitudinal direction (or parallel to the guide axis 31) away from one another. As a result, there is a force-locked connection or basic tension between the rail web 30 and the contact surface 6 of the clamping element 14 (see right-hand position in FIG. 4).

Now, in the event that the two rails 3 to be welded are not centred exactly with regard to the transverse direction of the rails, a transverse displacement of the clamped rail 3 can be achieved with actuation of the two eccenter drives 20 of a rail clamping assembly 2 (see FIG. 4). It goes without saying that, in order to maintain the clamping effect, a transverse displacement of the two clamping levers 10 lying opposite one another in pairs must be carried out in exact synchronisation. As a result of the transverse displacement of the clamping lever 10, during which the said basic tension is continuously maintained unrestrictedly, there is also a compensating sliding motion of the lever pivot axis 8 in the lever sliding track 17 (see FIG. 4). It would of course also be possible to move, by means of the corresponding eccenter drives 20, the clamping levers 10 of the other rail clamping assembly 2 in parallel for a transverse centring of the second rail 3.

Along with this precisely executable centring movement taking place transversely to the rail longitudinal direction, the rail head carriage 24 is automatically moved along by being displaced relative to the lever carriage 10, as a result of which the exact vertical centring of both rail ends is maintained unrestrictedly. The rail fixing tongs 21 connected to the rail head carriage 24 are also moved along automatically while a pressing force effective against the rail head carriage 24 is maintained. Thus it is ensured that the rails 3 can be centred precisely with respect to one another in vertical as well as horizontal direction.

In further sequence, the two rail clamping assemblies 2 together with the clamped rails 3 are moved towards one another by means of the compression cylinders 5, during which, as the displacement path progresses, an increasing self-clamping effect takes place automatically with which the clamping levers 10 positioned in pairs are pressed to the rail web 30 more strongly. With supply of current, the flash-butt welding is now carried out, and finally the weld bead is sheared off by means of the shearing device 13.

After the welding has taken place, the two rail clamping assemblies 2 are moved away from one another with the aid of the compression cylinders 5, which automatically causes a swift reduction of the clamping force of the clamping levers 10 which move by themselves slightly about the lever pivot axis 8. In further sequence, the carriage drives 19 as well as the eccenter drives 20 are actuated, resulting in a maximal distancing of the clamping levers 10 from one another, which at last enables a problem-free lifting off of the welding unit 1 from the welded rail 3. Prior to that, however, the two rail fixing tongs 21 must be opened.

The invention claimed is:

1. A welding unit for welding together two rails of a track, the welding unit comprising:
   two oppositely disposed rail clamping assemblies each including clamping jaws being displaceable in pairs within a pressing plane;
   said clamping jaws each being constructed as clamping levers, said clamping levers each having a lever pivot axis and a first lever end spaced apart from said lever pivot axis;
   each respective one of said clamping levers being pivotable in said pressing plane about said lever pivot axis of said respective clamping jaw;
   each respective one of said clamping jaws having a contact surface disposed at said first lever end for application to a rail web;
   said contact surfaces of said clamping jaws of each of said rail clamping assemblies being positioned closer to said oppositely disposed rail clamping assembly than said lever pivot axis of both of said clamping jaws;
   said first lever ends each being constructed as a respective clamping element including said contact surface being movable in said pressing plane;
   each of said clamping levers of a respective rail clamping assembly including a lever eccentric cam having an eccentric axis extending perpendicularly to said pressing plane, said lever eccentric cam being disposed between said clamping element and said lever pivot axis for displacement of said clamping lever in said pressing plane relative to said respective rail clamping assembly;

unit guides; and compression cylinders for moving said rail clamping assemblies towards one another along said unit guides in a rail longitudinal direction.

2. The welding unit according to claim 1, which further comprises lever gliding tracks each being disposed on a respective one of said rail clamping assemblies, said lever pivot axis of each of said clamping levers being constructed for displacement in a respective one of said lever gliding tracks parallel to said pressing plane relative to said respective rail clamping assembly.

3. The welding unit according to claim 1, which further comprises:

lever carriages;

carriage drives each configured for displacing said lever carriage parallel to said pressing plane in the rail longitudinal direction relative to a respective one of said rail clamping assemblies; and bolts each including said eccentric axis of a respective one of said clamping levers, said bolts each fastening said lever eccentric cam of a respective one of said two clamping levers of a respective rail clamping assembly on a respective one of said lever carriages.

4. The welding unit according to claim 1, which further comprises eccenter drives each fastened to a respective one of said lever carriages, each of said lever eccentric cams being rotatable about a respective eccentric axis by a respective one of said eccenter drives.

5. The welding unit according to claim 3, which further comprises rail fixing tongs connected to said lever carriages for gripping the rails.

6. The welding unit according to claim 3, which further comprises rail head carriages disposed in said lever carriages for application to a rail head, said rail head carriages each being displaceable relative to a respective one of said lever carriages parallel to said pressing plane in a pressing direction extending perpendicularly to the rail longitudinal direction.

7. The welding unit according to claim 6, wherein said rail head carriages each have two stop bars being spaced from one another in said pressing direction for application to a rail head side surface.

8. The welding unit according to claim 1, which further comprises pull rods each passing through an opening in a respective one of said clamping levers and serving as an assembly guide.

* * * * *